United States Patent [19]

Dickman

[11] 4,013,287
[45] Mar. 22, 1977

[54] LEG EXERCISE AND FOOT REST FOR AUTOMOTIVE VEHICLES

[76] Inventor: James J. Dickman, 2715 Durham Road, York, Pa. 17402

[22] Filed: Nov. 13, 1975

[21] Appl. No.: 631,740

[52] U.S. Cl. .............................. 272/136; 272/142; 272/130; 180/90; 272/143

[51] Int. Cl.² ........................................ A63B 21/04

[58] Field of Search .......... 272/136, 82, 83 R, 142, 272/135, 130, 79 R, 900, 96, 57 R, 94, 80, 93, 114; 180/90; 128/25 R; 273/55 R, 55 A

[56] References Cited

UNITED STATES PATENTS

| | | | |
|---|---|---|---|
| 1,965,511 | 7/1934 | Preston | 272/136 |
| 2,594,148 | 4/1952 | Galbois | 180/90 X |
| 2,919,134 | 12/1959 | Zuro | 272/136 |
| 3,193,288 | 7/1965 | Le Vell de Spain et al. | 272/136 |
| 3,606,321 | 9/1971 | Macoulis | 272/142 X |

FOREIGN PATENTS OR APPLICATIONS 1,075,029 2/1960 Germany ..................... 272/142

Primary Examiner—Richard C. Pinkham
Assistant Examiner—William R. Browne
Attorney, Agent, or Firm—C. Hercus Just

[57] ABSTRACT

A leg exerciser and foot rest attached to an automotive vehicle and having an attaching member secured to the lower part of an automobile dash panel to support the upper end of freely depending, extensible elastic means which has foot-engageable means on the lower end thereof so that especially the driver of the vehicle may exercise and rest the left leg by swinging it and/or extending and contracting the elastic member to exercise, and thereby restore circulation in, the inactive leg during long periods of driving the vehicle.

8 Claims, 6 Drawing Figures

LEG EXERCISE AND FOOT REST FOR AUTOMOTIVE VEHICLES

BACKGROUND OF THE INVENTION

In recent years, since the advent of automatic drive in most types of automotive vehicles, including passenger vehicles as well as trucks and the like, the left leg of the driver is, under most circumstances, totally unnecessary to effect normal driving of the vehicle. Accordingly, the left leg is relatively inactive, while the right leg actuates both the brake pedal as well as the accelerator pedal. Under such circumstances, the right leg experiences at least a limited amount of exercise during the time the left leg is inactive.

Medical evidence indicates that when persons who are particularly afflicted with circulatory problems maintain any of their limbs inactive for a substantial period of time, the situation becomes more aggravated and sometimes leads to permanent difficulty which results over a period of time in the afflicted limb becoming permanently impaired. From this, it readily can be seen that persons such as salemen, delivery men, truck and bus drivers, taxi drivers, as well as other persons who drive as much as 40,000 or 50,000 or more miles per year in vehicles having automatic drives experience long periods when, for example, their left leg is inactive. If such persons have circulatory problems, and even if they are in normal health, maintaining the left leg inactive for long periods of time can result in the commencement of a problem condition.

Various attempts have been resorted to in the past to minimize such conditions by at least providing means which enable the drivers of vehicles to rest the inactive leg, particularly by providing elevated means supported by the left side of the floor of the vehicle, to the left of the brake pedal, in order that the driver may vary the position of their left leg, for example, between resting directly upon the floor and resting upon the support member. One such example of this is illustrated in U.S. Pat. NO. 3,047,088 to Murrell, dated July 31, 1962. Another type of foot or leg rest which permits limited variation in the position in which the feet are supported is disclosed in U.S. Pat. No. 1,113,601, to Caldwell, dated Oct. 13, 1914. It is obvious that this patent was developed for the passengers of the vehicle and long prior to the advent of automatic drives in vehicles and primarily is intended to prevent the jaring and jolting of normal movement of the vehicle, especially over rough roads, from being imparted to the feet of the occupants and to accomplish this, the transverse member upon which the feet rest is at a level very close to the floor and actually comprises a substitute for the floor and the spring means employed solely is for purposes of absorbing shock.

There also are several prior patents which appear to be for use with the leg that normally operates the brake and/or accelerator pedal, these being U.S. Pat. Nos. 2,328,991, to Murdaugh et al., dated Sept. 7, 1943; No. 2,473,947 to Hamstron, dated June 21, 1949, and No. 2,133,443, to Girl, dated Oct. 18, 1936.

Still another adjustable support for the lower part of the leg of an occupant of an automotive vehicle is shown in U.S. Pat. No. 1,525,864, to Hueseman, dated Feb. 10, 1925.

The present invention primarily differs from the prior art referred to above in several major respects, the most important of which is that the present invention provides legexercising means of substantial amplitude and the device also is illustrated in a number of embodiments which are all relatively simple, reasonably inexpensive to manufacture, and are readily installed.

SUMMARY OF THE INVENTION

It is the principal object of the present invention to provide a leg exercise device which also serves as a foot and leg rest which is attachable to the lower portion of the dash panel of an automotive vehicle and depends freely therefrom for movement in all lateral directions as well as being extensible and contractible to permit the occupant of a vehicle to undertake substantial exercise of a leg when the foot on the leg is in position upon the foot-engageable member of the exercising and rest device.

It is another object of the invention to form the leg exercising and foot rest from readily available means including a longitudinal tension type coiled spring, commonly known as "screen door springs" which are highly suitable for the purpose, and either a single length of said spring being employed in conjunction with a stirrup member or, in another form, a suitable length of such spring is arranged in looped configuration and the ends of the spring are substantially brought together and affixed to a common support such as an eye-bolt or mechanically equivalent means by which the spring is connected to the lower portion of the dash panel of a vehicle.

A still further object of the invention is to employ relatively simple and inexpensive means as the foot-engageable member of the leg exercising and foot rest device, such as a suitable length of tubular material such as hose, including garden hose, of suitable diameter, formed from plastic, rubber or otherwise.

Details of the foregoing objects and of the invention, as well as other objects thereof, are set forth in the following specification and illustrated in the accompanying drawing comprising a part thereof.

DETAILED DESCRIPTION

Figure 1:
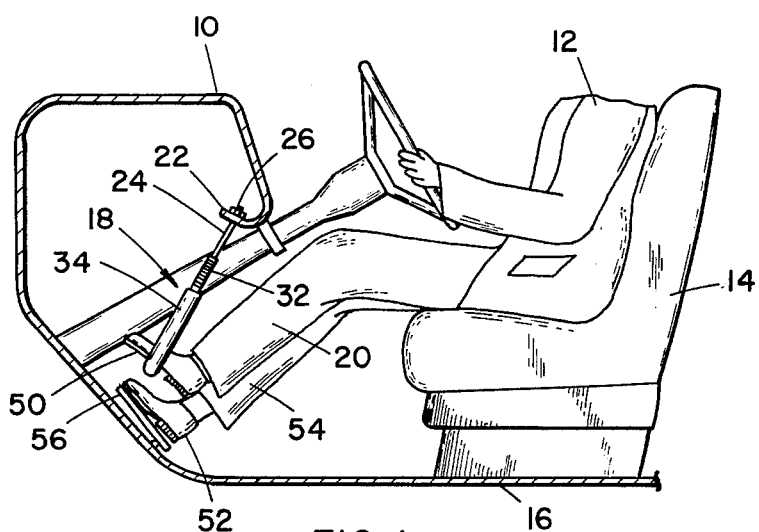
FIG. 1 is a side elevation, partly in vertical section, illustrating fragmentarily an exemplary installation of the present invention at the preferred location thereof in an automotive vehicle and showing the manner in which the leg exercising and foot rest comprising the present invention is used.

Referring to FIG. 1, there is illustrated in vertical section a dash panel 10 of an automotive vehicle which may be either a passenger automobile, truck, bus, or other similar vehicle in which an occupant, such as the driver or passenger 12, is seated upon the front seat 14 which is supported upon the floor 16. While the leg exercising and foor rest unit 18 primarily is adapted for use by the left leg 20 of the driver 12 of the vehicle, it is to be understood that the invention also could be utilized by a passenger seated upon the front seat of the vehicle, whereby the unit 18 is adapted to be mounted adjacent the right side of the front compartment of the vehicle for use by a passenger occupant thereof as distinquished from the driver.

In its simplest form, it has been found that in most modern vehicles, the dash panel 10 has an inner, forwardly extending flange 22 which provides a very convenient means to which an attaching member 24 for the unit 18 may be connected.

Figure 2:
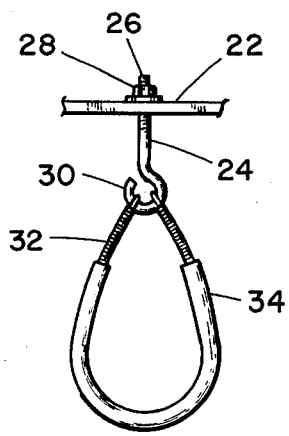
FIG. 2 is a vertical elevation of one embodiment of the exercising and rest device comprising the present invention attached to a fragmentarily illustrated portion of the dash panel of an automotive vehicle.
Figure 3:
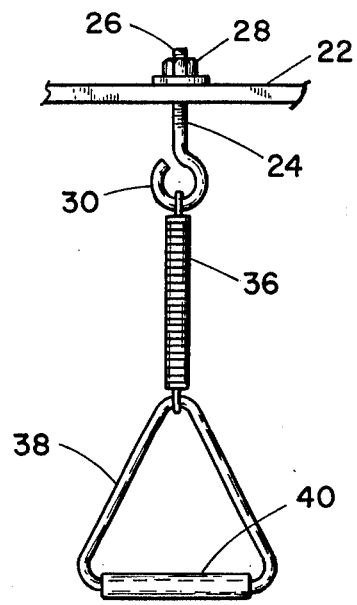
FIG. 3 is a view similar to FIG. 2 but illustrating a further embodiment of the present invention.

In the embodiments shown respectively in FIGS. 1–3, the attaching member 24 comprises an eye-bolt, the threaded stem 26 of which extends through a hole in the inwardly extending flange 22 and a nut 28 completes the connecton of the supporting member 24 to flange 22. The circular loop 30 of the eye-bolt extends downwardly from the flange 22.

The unit 18 also includes extensible elastic means 32 which, in the embodiment shown in FIGS. 1 and 2, comprises an elongated tension type coiled spring such as commonly employed in connection with screen doors to close them automatically, but it is to be understood that, in lieu of said spring, any other suitable elastic, self-retracting means such as an appropriate length of rubber or corresponding material, or a pneumatic cylinder unit may be employed. As shown particularly in FIG. 2 the elastic means comprising the spring is in loop configuration and the opposite ends of the spring are commonly connected to the circular loop 30 comprising the eye of the eye-bolt type attaching member 24. In use, the spring in the embodiment shown in FIGS. 1 and 2 may be of the order of between twelve and sixteen inches, or possibly a little longer and, associated with said spring 32 is foot-engageable means 34 which in said embodiment, preferably is in the form of a tube of limited flexibility and of suitable length, which is less than that of the spring 32, in order that the spring may be extended through the tube 43 to dispose the tube preferably substantially midway between the opposite ends of the spring 32 in order that the occupant 12 may extend his left foot, for example, through the lower part of the loop 34. The tube comprising said foot-engageable means 34 may be of conventional garden hose type, for example, and formed either from plastic or appropriate rubber compounds of the type from which many types of garden hose are formed, all of which have only limited flexibility and this characteristic would prevent the looped portion of the means 34 form engaging the foot of the occupant too tightly, as well as protect the shoe from scratches.

In the embodiment of the invention shown in FIG. 3, only a single short length of spring 36 comprises the extensible elastic means of said embodiment. One end of the spring 36 is connected to the circular loop 30 of the eye-bolt 24 and the opposite end of the spring 36 receives the upper end of a stirrup-like foot-engageable member 38 which, for example, may be formed from appropriate wire and, if desired, a short section of tubular material is provided for direct engagement by the foot of the occupant. If desired, the tubular member 40 also may be composed of garden hose or similar equivalent material.

Figure 4:
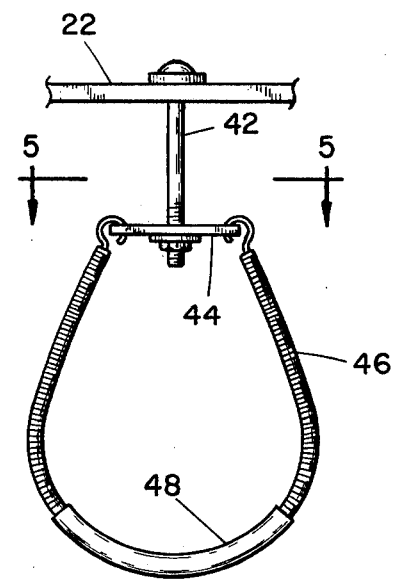
FIG. 4 is a view similar to FIGS. 2 and 3 but illustrating a still further embodiment of the invention.
Figure 5:
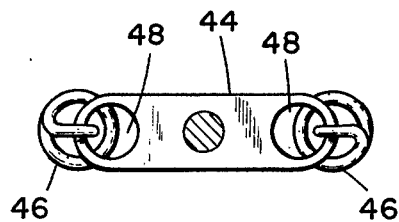
FIG. 5 is an enlarged, fragmentary plan view of an element of the embodiment of the inventon shown in FIG. 4 as seen on the line 5—5 thereof.

Still another embodiment of the invention is illustrated in FIG. 4 in which the attaching means comprises a conventional bolt 42, the upper end of which extends through a hole in the flange 22 of the dash panel 10. Connected to the lower end of bolt 42 is a plate-like member 44, details of which are best shown in plan view in FIG. 5 on a larger scale than employed in FIG. 4. The extensible elastic means of said embodiment in FIG. 4 comprises a spring 46 which is similar to the spring 32 of the embodiment shown in FIGS. 1 and 2 and is substantially of the same length. As in regard to said preceding embodiment however, another type of elastic means, such as a strip of rubber or the like, may be employed in lieu of the coiled wire spring 46 which is specifically illustrated in FIG. 4. The plate-like member 44 also is provided with holes 48 in the opposite ends thereof to which the opposite ends of the spring 46 are connected. Particularly when the extensible elastic means of the embodiment shown in FIG. 4 comprises the spring 46, it is preferred that the foot-engageable means comprise the section 48 of tubular material similar to that employed in the preceding embodiments such as element 34 in FIGS. 1 and 2 and element 40 in FIG. 3. If desired, the tubular member 48 in FIG. 4 may be longer than illustrated and extend farther up the opposite ends of the spring toward the member 44, thereby affording greater protection to the shoe on the foot of the user extended through the loop configuration of the extensible elastic means of said embodiment.

Figure 6:
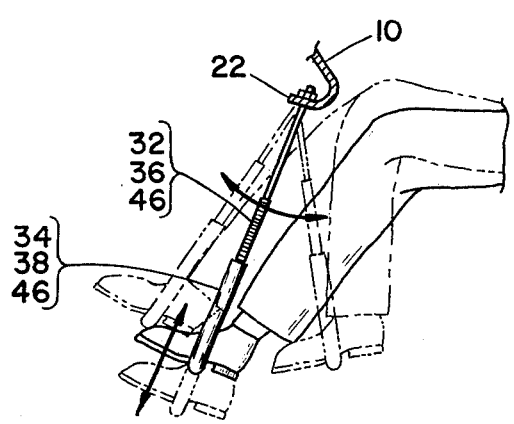
FIG. 6 is a fragmentary view similar to a portion of FIG. 1 but illustrating in both full lines and phantom various positions at which the leg of the occupant of an automotive vehicle may be disposed incident to exercising the same as well as supporting it in rest position.

In all of the embodiments described above, it will be seen that the extensible elastic means in all of them, at the upper ends thereof, are freely and swivelly connected to the attaching means 24 and 42 of the respective embodiments, whereby as illustrated diagramatically in FIG. 6, the leg 20 of the occupant which is disposed in the foot engageable means thereof may be moved backward and forward, sidewise in opposite directions, around in circles, as well as moving downward and upward by means of extending and contracting the extensible elastic means of each of said embodiments, thereby affording substantially universal exercising of the leg 20 which engages the leg exerciser and foot rest comprising the present invention. A certain amount of physical energy is required to extend the elastic means by the occupant forceably pushing downward, and possibly somewhat forwardly, upon the foot-engageable means and thereby develop contracting force in said spring which is utilized upon release of the force applied downwardly upon the foot-engageable means and serve automatically to restore the leg to the initial position by contraction of the elastic means connected to the foot-engageable means of each of the embodiments.

In addition to the exercising capabilities of the various embodiments of the present invention however, it will be seen by observing FIG. 1 that the foot 50 of the left leg 20 of the occupant 12 may simply repose within the foot-engageable means 34 of the embodiment illustrated in said figure but similarly may be placed in repose in any of the other embodiments of the invention, while the leg 20 remains still and thus provide a rest for the foot and leg by varying the position thereof from resting upon the floor 16 of the vehicle, while the foot 52 on the right hand leg 54 of the occupant 12 operatively engages either the accelerator pedal 56, or the brake pedal, not shown.

In view of the foregoing, it will be seen that the very simple embodiments of the present invention aford a highly effective means for exercising the idle leg of the driver of a vehicle or, if desired, both legs of a passenger if the units comprising the present invention are mounted on the passenger side of the vehicle. By affording such exercising capabilities, circulation in the idle leg may be maintained normal so that upon emerging from the vehicle after a long steady drive for example, said leg is neither stiff nor "asleep". Under circumstances where the driver or occupant are subject to circulatory problems, the situation which aggravates the same may be alleviated to a reasonable extent.

While the invention has been described and illustrated in its several preferred embodiments, it should be understood that the invention is not to be limited to the precise details herein illustrated and described since the same be carried out out in other ways falling within the scope of the invention as illustrated and described.

I claim:

1. The combination of a leg exercising and rest device for drivers of automotive vehicles comprising; an automotive vehicle having fixed means adjacent the dash panel thereof and positioned laterally from the brake pedal, an attaching member secured to said fixed means, extensible self-retracting means movably connected at one end to said attaching member and depending therefrom for free swinging support thereby laterally from the brake pedal of said vehicle, and foot-engageable means attached to the depending end of said extensible self-retracting means for reception of the foot of an occupant of the vehicle selectively for supporting and exercising the leg of the occupant attached to said foot by pushing upon said foot-engageable means to extend said extensible self-retracting means to develop tension therein and permitting said tension to retract said foot-engageable member and thereby exercise said leg of the occupant by successive movements as described.

2. The exercising and rest device according to claim 1 in which said one end of said extensible self-retracting means is connected to said attaching member by swivel means comprising the sole support for said extensible self-retracting means and permitting free swinging and extending and contracting movements of said extensible self-retracting means and foot-engageable means thereon relative to said attaching member.

3. The leg exercising and rest device according to claim 1 in which said fixed means adjacent the dash panel comprises a flange thereon and said attaching means comprises an eye-bolt secured firmly to said flange of the dash panel of said vehicle, and said one end of said self-retracting means being connected to the eye of said eye-bolt and depending freely and swivelly therefrom.

4. The leg exercising and rest device according to claim 3 in which said self-retracting means is a single elongated tension spring.

5. The leg exercising and rest device according to claim 4 in which said foot-engageable means is a stirrup-like member connected to the depending end of said spring.

6. The leg exercising and rest device according to claim 3 in which said self-retracting means comprises an elongated tension spring having opposite ends, said spring being looped and said opposite ends being commonly connected to the eye of said eye-bolt.

7. The leg exercising and rest device according to claim 6 further including a tubular cover member of limited flexibility and of less length than said spring, said spring extending through said tubular cover member and said member being positioned substantially midway between the opposite ends of said spring, the mid-portion of said cover member comprising said foot-engageable means.

8. The combination of a leg exercising and rest device according to claim 1 in which said attaching member comprises a bolt connectable firmly to the dash panel of said automotive vehicle, a plate-like member having a central portion connected to the shank of said bolt, the opposite ends of said plate-like member having apertures therethrough, and self-retracting means comprising an elongated tension spring arranged in looped configuration and the opposite ends thereof being connected to said apertures in said plate-like member, and foot-engageable means connected to the midportion of the loop of said spring.

* * * * *